P. & M. J. RAU.
TIRE TIGHTENER.
APPLICATION FILED JULY 27, 1908.
904,993.
Patented Nov. 24, 1908.
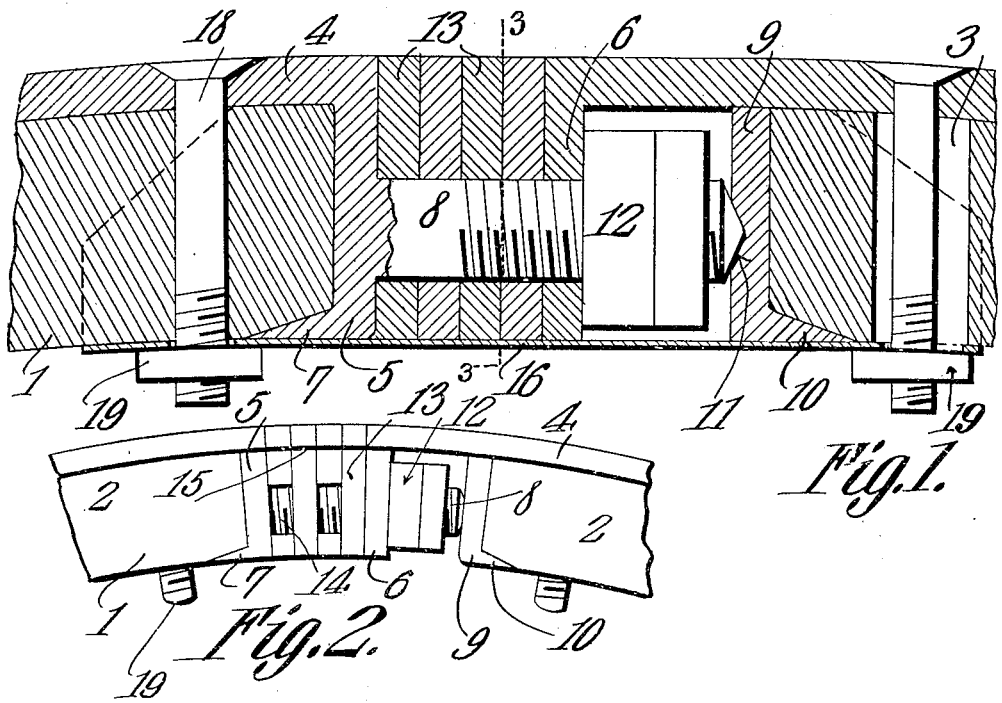
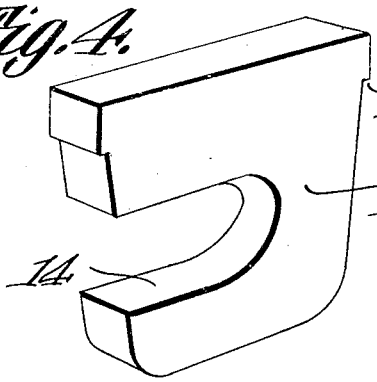
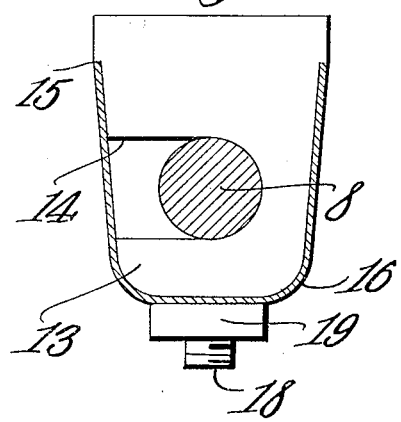
Witnesses
Inventors
Paul Rau and
Michael J. Rau
By C. A. Snow & Co.
Attorneys

UNITED STATES PATENT OFFICE.

PAUL RAU AND MICHAEL J. RAU, OF GARDEN PLAIN, KANSAS.

TIRE-TIGHTENER.

No. 904,993.　　　Specification of Letters Patent.　　　Patented Nov. 24, 1908.

Application filed July 27, 1908. Serial No. 445,540

*To all whom it may concern:*

Be it known that we, PAUL RAU and MICHAEL J. RAU, citizens of the United States, residing at Garden Plain, in the county of Sedgwick, State of Kansas, have invented a new and useful Tire-Tightener, of which the following is a specification.

This invention relates to tire tighteners, and has for its principal object to provide a novel means for tightening the iron tire of a vehicle wheel.

With this and other objects in view, as will more fully hereinafter appear, the invention consists in certain novel features of construction and arrangement of parts, hereinafter fully described, illustrated in the accompanying drawings, and particularly pointed out in the appended claim, it being understood that various changes in the form, proportions, size and minor details of the structure may be made without departing from the spirit or sacrificing any of the advantages of the invention.

In the accompanying drawings:—Figure 1 is a longitudinal sectional elevation through the felly of the wheel. Fig. 2 is a side elevation of the same on a somewhat smaller scale, the shield being removed. Fig. 3 is a transverse sectional view on the line 3—3 of Fig. 1. Fig. 4 is a perspective view of one of the slugs used in the tightener.

Similar numerals of reference are employed to indicate corresponding parts throughout the several figures of the drawings.

The rim or felly 1 of the wheel is of a diameter somewhat less than that of the tire and its ends are spaced apart, as clearly shown in Figs. 1 and 2, and one end of the felly is provided with an elongated slot 3.

The tire 4 surrounds the felly 1 and is provided at its ends with inwardly extending flanges 5 and 6, the flange 5 being adapted to fit snugly against the extreme end of the felly and being provided at its inner end with a tapered shoulder 7 which fits in a correspondingly shaped recess formed in the inner face of the felly. Extending from and preferably formed integral with the flange 5 is a bolt which passes through an opening formed in the flange 6 and bears against a small plate 9 that is provided with a depression for the reception of the tapered end of the bolt. The plate 9 fits against the slotted end of the felly and is provided with a tapered shoulder 10 fitting in a correspondingly shaped recess formed in the inner face of said felly.

Arranged on the bolt 8 are two nuts 12, the innermost nut bearing against the inner face of the flange 6, and serving when tightened to draw the ends of the tire together, while the outer nut acts merely for the purpose of locking the inner nut from turning movement. The bolt 8 acts to maintain the ends of the felly at a predetermined distance from each other, so that there will be no danger of distortion of the spokes of the wheel.

Arranged between the flanges 5 and 6 of the tire are a number of filling blocks or slugs 13, each of which is provided with a laterally disposed slot 14, adapted to receive the draw bolt 8. The slots extend outward to one side of the slugs, and in placing the latter in position on the bolts, the open ends of the slots are alternately disposed, that is to say, the slot of one slug is disposed in a direction opposite that of the slots of the adjacent slugs. The body portions of the slugs occupy the same planes or aline with the sides of the felly 2, and the slugs are provided with shoulders 15 which occupy the same planes, or are flush with the edges of the tire 4.

When the inner jam nut 12 is tightened up, the slugs 13 will be firmly held in place and the tire 4 will be held in proper position upon the felly. When, however, the tire expands by becoming heated or from other cause, one of the slugs may be removed and the jam nut further tightened in order to draw the ends of the tire toward each other, while the thrust bolt 8 serves to prevent any similar movement of the felly and consequent distortion of the spokes.

Extending around the inner face of the felly is a substantially U-shaped metallic shield 16, the edges of which bear against the projecting edges of the tire and the inner faces of the shoulders 15, thus serving to prevent movement of the slugs with the draw bolt 8 as an axis. Near the opposite ends of the lower portion of the shield are openings for the passage of a pair of securing bolts 18, which extend through openings formed in the felly and tire, the outer ends of the bolts being headed and fitting in correspondingly shaped recesses formed in the outer face of the tire, while the inner ends of the bolts are threaded and receive clamping nuts 19 by which the shield is confined in place.

What is claimed is:—

The combination with a wheel having a felly, one end of which is provided with a slot, a tire surrounding the felly and having end flanges turned inward, one of the flanges being provided with a tapered shoulder fitting in a corresponding recess in the inner face of the felly, a wear plate fitting against the slotted end of the felly and provided with a tapered shoulder fitting in a correspondingly shaped recess in the felly, a draw bolt extending from one of the tire flanges and passing through an opening in the other flange, the end of the bolt being seated in a depression formed in the wear plate, a jam nut on the draw bolt, removable slugs arranged to fit between the tire flanges and provided with slots for passage over the draw bolt, the opposite ends of said slugs being provided with shoulders corresponding to the shape of the tire, a shield extending around the inner face of the felly, the opposite edges of the shield bearing against the inner face of the tire and serving by engagement with the shoulders of the slugs to prevent displacement of the latter, and bolts extending through the shield, the felly and the tire, one of said bolts passing through the slotted portion of the felly to thereby permit adjustment of the parts.

In testimony that we claim the foregoing as our own, we have hereto affixed our signatures in the presence of two witnesses.

PAUL RAU.
MICHAEL J. RAU.

Witnesses:
HENRY TENNISSON,
MATHIAS PELZ.